(12) United States Patent
Ward et al.

(10) Patent No.: US 7,344,012 B2
(45) Date of Patent: Mar. 18, 2008

(54) TRANSMISSION BRAKE CONTROL ASSEMBLY

(75) Inventors: Lance Ward, Lansing, MI (US); Kevin Winstead, Falkner, MS (US)

(73) Assignee: TCI Automotive, LLC, Ashland, MS (US)

( * ) Notice: Subject to any disclaimer, the term of this patent is extended or adjusted under 35 U.S.C. 154(b) by 158 days.

(21) Appl. No.: 11/328,374

(22) Filed: Jan. 9, 2006

(65) Prior Publication Data

US 2007/0161458 A1  Jul. 12, 2007

(51) Int. Cl.
*B60W 10/10* (2006.01)
(52) U.S. Cl. ..................................... 192/218
(58) Field of Classification Search ............... None
See application file for complete search history.

(56) References Cited

U.S. PATENT DOCUMENTS 4,664,247 A * 5/1987 Wolf et al. ................. 198/323

\* cited by examiner

*Primary Examiner*—Dirk Wright
(74) *Attorney, Agent, or Firm*—Reising Ethington Barnes Kisselle, P.C.

(57) ABSTRACT

A transmission brake assembly for controlling an output of a transmission of a motor vehicle includes a solenoid which is operatively engagable with a transmission. The solenoid selectively engages and disengages the transmission. A solenoid driver is electrically connected to the solenoid to drive the solenoid into and out of engagement with the transmission. The transmission brake assembly also includes a controller electrically connected to the solenoid driver. The controller turns the solenoid driver between an on state, an off state, and an intermediate state such that the solenoid partially engages the transmission to allow the motor vehicle to move forward at a minimal speed.

21 Claims, 4 Drawing Sheets

TRANSMISSION BRAKE CONTROL ASSEMBLY

BACKGROUND ART

1. Field of the Invention

The invention generally relates to transmission brake controls for motor vehicles. More particularly, the invention relates to a transmission brake control assembly that allows a motor vehicle to partially move without fully disengaging the transmission brake.

2. Description of the Related Art

A transmission brake, or trans-brake, is used to lock the transmission preventing the transmission from turning. A transmission brake is normally controlled through an electrical solenoid. The electrical solenoid locks the transmission brake by preventing a driven shaft from rotating. The transmission brake is typically operated using a button-type switch which is under the control of the vehicle operator. Once the transmission brake is enabled, the motor vehicle is prevented from moving until the transmission brake is released.

The transmission brake is a device that is used in various situations, including drag racing events. Once the motor vehicle is positioned on the starting line, the vehicle operator engages the transmission brake, allowing the operator to manipulate the throttle without moving the motor vehicle. The benefit in drag racing is the ability to provide all available power from the internal combustion engine while the motor vehicle is held stationary. The button-type switch used to release the transmission brake releases the motor vehicle to allow it to move within a very short reaction time.

In many applications, it is desirable to allow the motor vehicle to move (creep) under a controlled fashion on the starting line of a drag race track. Drag racing uses a rather complex method of ensuring that the motor vehicle is aligned in the proper position at the starting line by imposing a "pre-stage" position indication and a "staged" position indication. When two motor vehicles which are competing are both "staged" the race may begin at the starting line official's discretion. An operator of a motor vehicle equipped with a transmission brake would normally engage it when he has received the "staged" indication. The "pre-staged" indication is to let the operator know that the motor vehicle is in a pre-set distance from the "staged" position. In many cases, it would be advantageous for the operator to prepare for the start of the race as early as possible from a known position. The current control assemblies for transmission brakes do not, however, provide for any such movement of the motor vehicle as the transmission brake control assemblies currently are digital, i.e., either on or off.

SUMMARY OF THE INVENTION

A transmission brake assembly for controlling an output of a transmission of a motor vehicle includes a solenoid which is operatively engagable with a transmission. The solenoid selectively engages and disengages the transmission. A solenoid driver is electrically connected to the solenoid to drive the solenoid into and out of engagement with the transmission. The transmission brake assembly also includes a controller electrically connected to the solenoid driver. The controller turns the solenoid driver between an on state, an off state, and an intermediate state such that the solenoid partially engages the transmission to allow the motor vehicle to move forward at a minimal speed.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
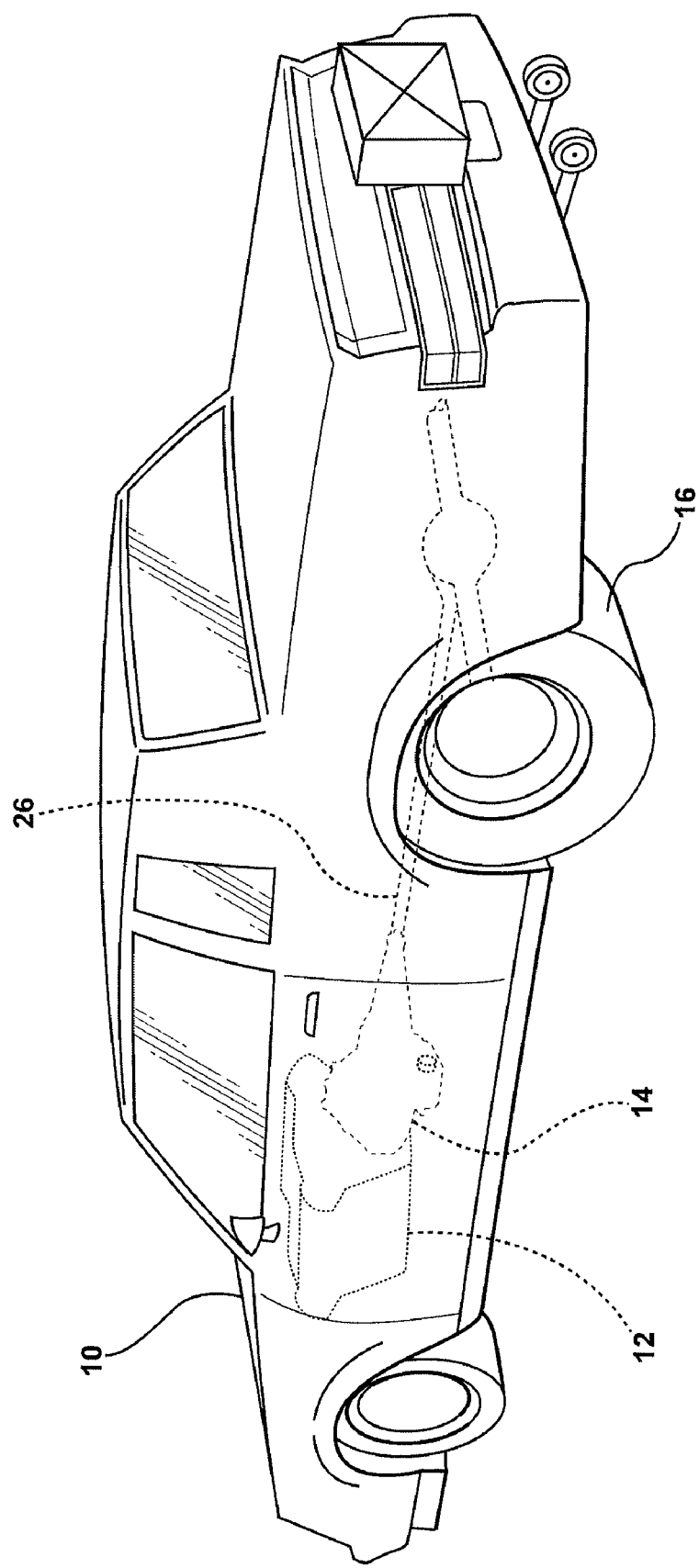
FIG. 1 is a perspective view of a motor vehicle incorporating one embodiment of the invention.

Referring to FIG. 1, a perspective view of a motor vehicle 10 is shown. The motor vehicle is powered by an internal combustion engine 12 using a transmission 14 (shown in phantom in FIG. 1 and shown in FIG. 2) to transfer the power generated by the internal combustion engine 12 to rear wheels 16 of the motor vehicle 10. This embodiment of a motor vehicle 10 is designed to drag race. In drag racing, maximizing the power at the start of the race is desirable.

Figure 2:
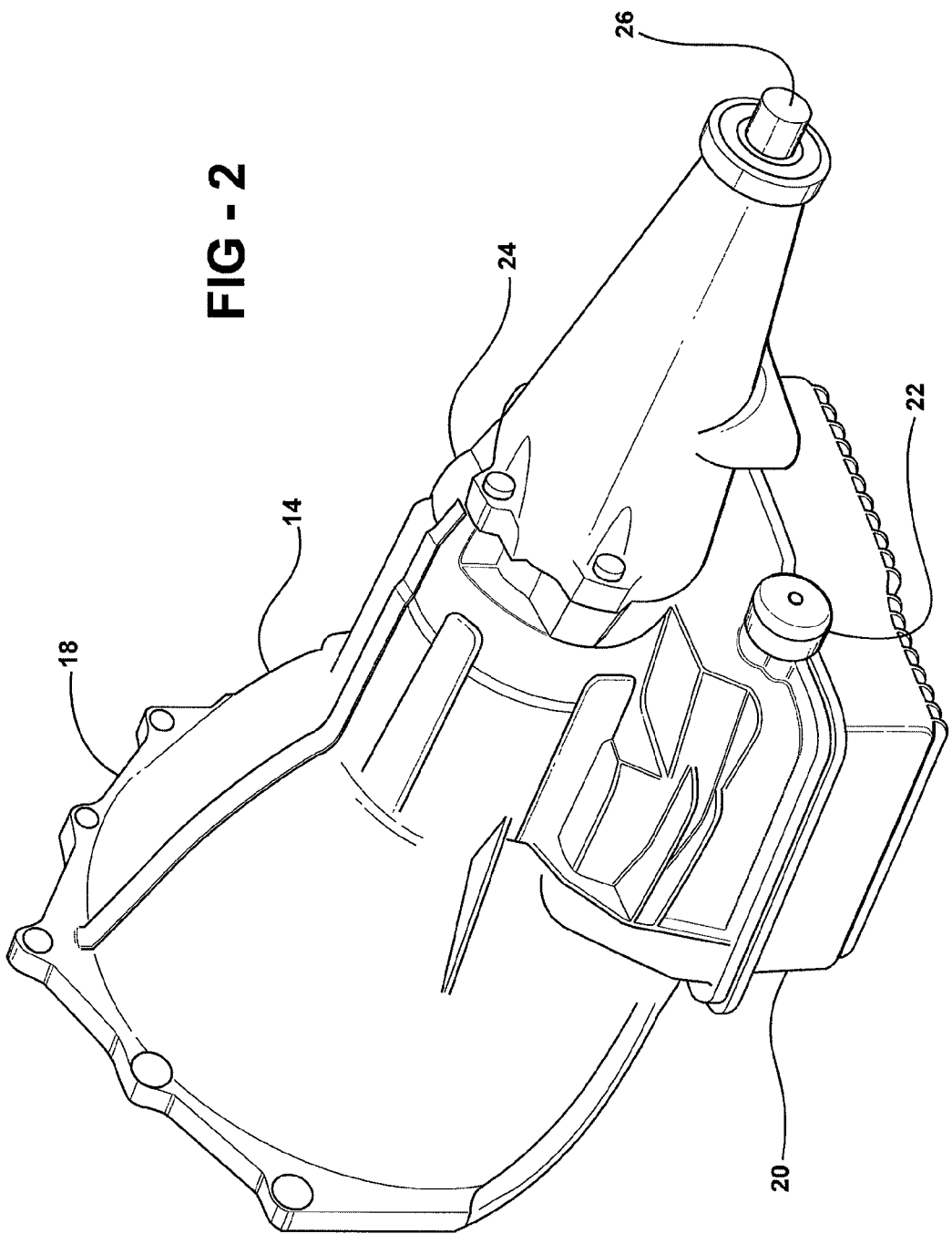
FIG. 2 is a perspective view of a transmission and a trans-brake solenoid mounted thereto.

Referring to FIG. 2, a perspective view of the transmission 14 is shown. The transmission 14 includes a transmission case 18 that houses the gears (not shown) that are shifted between in order to change the ratio of power to driven force. A transmission pan 20 is fixedly secured to the bottom of the transmission case 18. The transmission pan 20 retains transmission fluid therein which is used to lubricate and cool the gears during the operation of the transmission 14.

A transmission brake solenoid 22 is fixedly secured to the transmission 14 toward an anterior end 24 of the transmission case 18. The transmission brake solenoid 22 extends out from the transmission case 18 and allows electrical connection thereto. The transmission brake solenoid 22 engages the transmission 14 and prevents the gears from rotating even though the transmission 14 is engaged with the internal combustion engine 12 and the internal combustion engine 12 is running. In other words, the transmission brake solenoid 22 interrupts the normal operation of the transmission 14 with respect to the internal combustion engine 12. This is done by separating the transmission 14 from a driveshaft 26 that is used to drive the rear wheel 16 of the motor vehicle 10.

Figure 3:
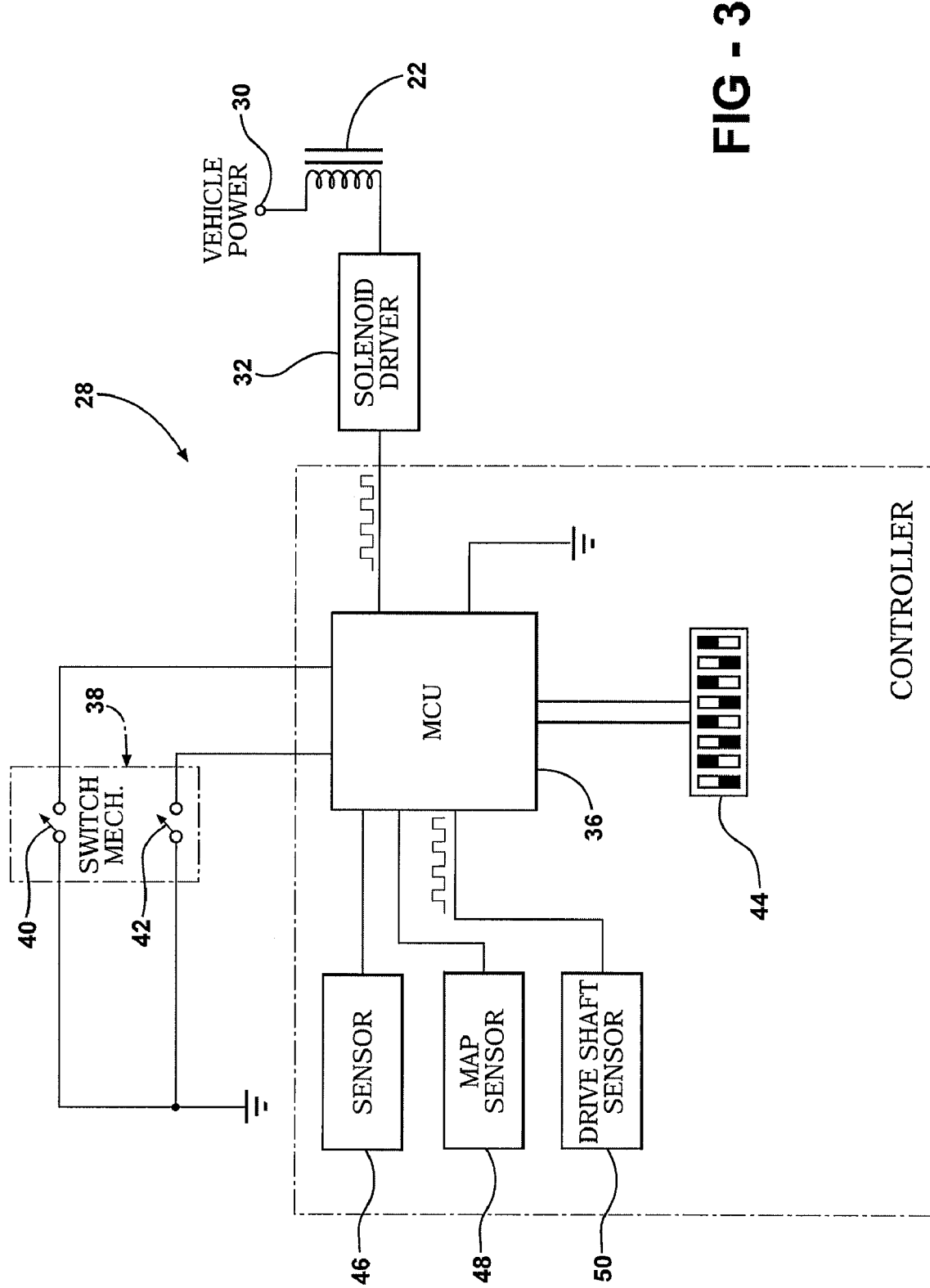
FIG. 3 is a schematic diagram of a first embodiment of the invention.

Referring to FIG. 3, one embodiment of the transmission brake assembly is generally indicated at 28. The transmission brake assembly 28 controls the output of the transmission 14. The transmission brake assembly 28 includes the transmission brake solenoid 22, which is electrically connected, at 30, to a power system of the motor vehicle 10. As discussed above, the transmission brake solenoid 22 is operatively engagable with the transmission 14 to selectively engage and disengage the transmission 14 from the driveshaft 26.

The transmission brake assembly 28 also includes a solenoid driver 32, which is electrically connected to the transmission brake solenoid 22. The solenoid driver 32 drives the solenoid 22 into and out of engagement with the transmission 14.

The transmission brake assembly 28 also includes a controller, generally shown at 34. The controller 34 is electrically connected to the solenoid driver 32. The controller 34 turns the solenoid driver 32 between an on state, an off state, and an intermediate state such that the solenoid 22 partially engages the transmission 14. By partially engaging the transmission 14, the transmission brake assembly 28 allows the motor vehicle 10 to move forward at a minimal speed, i.e., creeping.

The controller 34 includes a micro-control unit 36. The micro-control unit 36 is electrically connected to the solenoid driver 32 to produce a pulse-width modulated signal to activate the solenoid driver 32 to either the on state or the intermediate state.

The transmission brake assembly 28 also includes a switching mechanism, generally shown at 38. The switching mechanism 38 is electrically connected to the micro-control unit 36. The switching mechanism 38 provides a switch input to the micro-control unit 36 to identify or set the pulse-width modulated signal produced by the micro-control unit 36.

More specifically, the switching mechanism includes two switches identified as a brake activation switch 40 and a brake creep switch 42.

More specifically, the brake activation switch 40 is a switch which turns the transmission brake assembly 28 on or off. By closing the brake activation switch 40, the transmission brake solenoid 22 engages the transmission 14 and prevents the transmission 14 from driving the driveshaft 26. When the brake activation switch 40 is open, the transmission brake solenoid 22 disengages the transmission 14 allowing the transmission 14 to drive the driveshaft 26 allowing the motor vehicle 10 to move.

While the brake activation switch 40 is closed, i.e., when the transmission brake assembly 28 is activated, the brake creep switch 42 may be opened or closed. When the brake creep switch 42 is open, the transmission brake assembly 28 is in the on state. As such, the transmission brake solenoid 22 fully engages the transmission 14. When the brake creep switch 42 is closed, the micro-control unit 36 provides a signal to the solenoid driver 32 which is less than 100% duty cycle pulse-width modulation. As such, the transmission brake solenoid 22 allows the transmission 14 to engage the driveshaft 26 at least partially. This will allow the motor vehicle 10 to move or creep into a desired position. This is advantageous because it will allow the driver of the motor vehicle 10 to slowly move to a start position while maintaining the transmission brake assembly 28 in an activated state. Once the brake creep switch 42 is opened again, the micro-control unit 36 will return to providing a 100% duty cycle pulse-width modulated signal to completely disengage the transmission 14 from the driveshaft 26. In other words, the transmission 14 is locked so that the power from the internal combustion engine 12 cannot reach the driveshaft 26.

In addition to using the back creep switch 42, the transmission brake assembly 28 includes a programming input device to set and modify operating parameters of the micro-control unit 36. The programming controls may identify certain inputs receivable by the micro-control unit 36 such that the micro-control unit 36 will reduce the duty cycle of the solenoid driver 32 to allow creep to occur if certain parameters exist. The sensing of the parameter will be discussed in greater detail subsequently. The programming input device 44 is shown in FIG. 3 to be hard-wired to the micro-control unit 36.

In the embodiment shown in FIG. 3, the micro-control unit 36 receives inputs from three different sensors 46, 48, 50. The first sensor 46 is a throttle position sensor. The throttle position sensor 46 identifies the position of the throttle to determine whether the throttle position is in a minimum output position. If so, creep of the motor vehicle 10 would be permissive. The second sensor is a MAP sensor 48 to measure the manifold absolute pressure. Again, the micro-control unit 36 would be programmed by the programming controls 44 to only allow creep of the motor vehicle 10 when the pressure sensed by the MAP sensor 48 is at a minimum. The third sensor is a driveshaft rotation sensor 50. The driveshaft rotation sensor 50 measures the rotation of the driveshaft 26 and the speed with which the driveshaft is rotating. Because the driveshaft 26 is hard coupled to the rear axle and rear wheels 16, linear displacement of the motor vehicle 10 is known. It should be appreciated by those skilled in the art that the transmission brake assembly 28 may employ more or other parameters and input conditions to identify when it is proper to allow the transmission brake assembly 28 to allow for creep in the motor vehicle 10 to occur.

Figure 4:
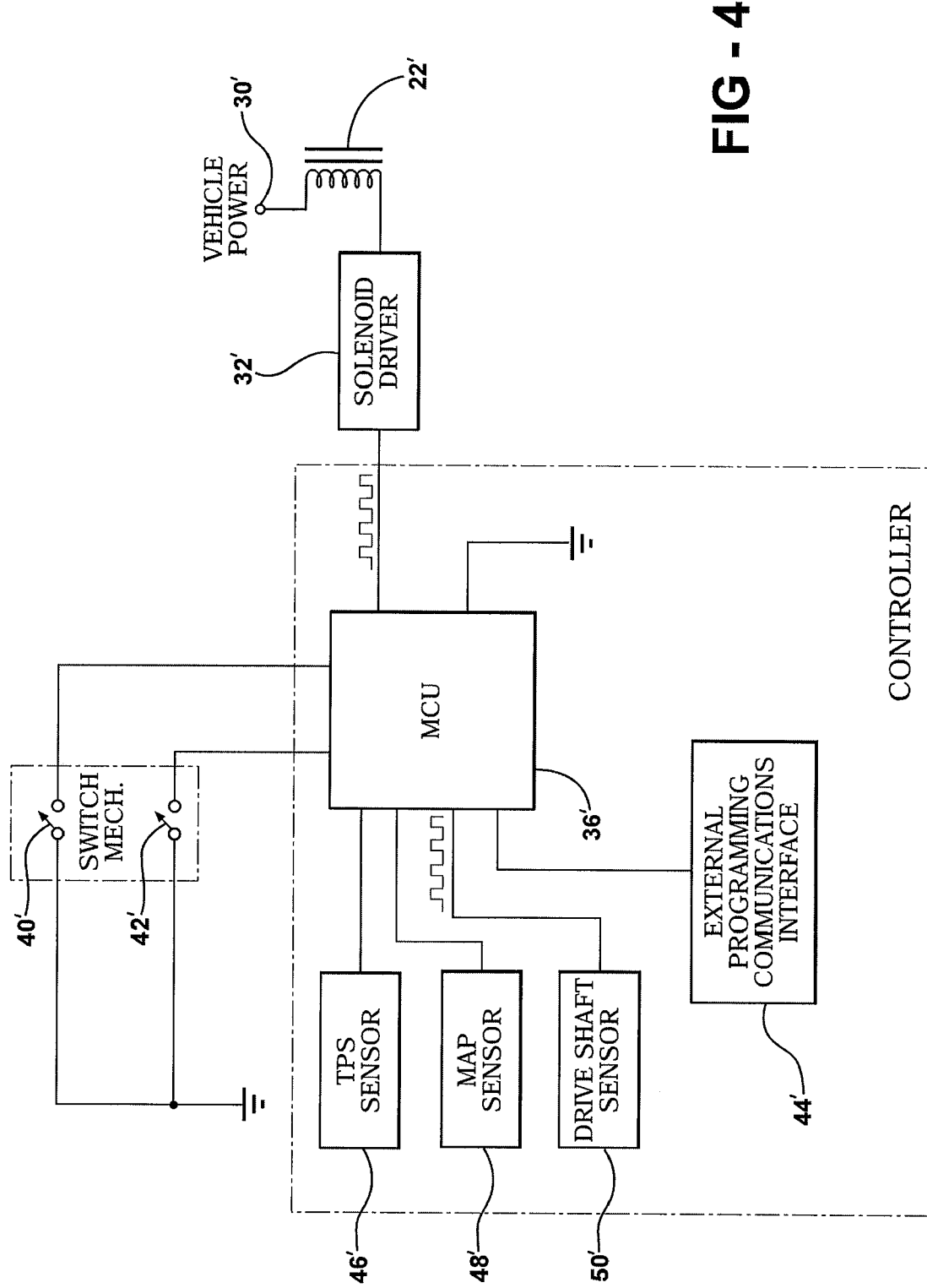
FIG. 4 is a schematic diagram of a second embodiment of the invention.

Referring to FIG. 4, a second embodiment of the transmission brake assembly 28' is shown, wherein like prime numerals represent similar elements described above in the first embodiment. In the second embodiment, the programming input device 44 was a hard-wired switch device, such as DIP or rotary switches. In the second embodiment, this device is replaced with an external programming communications interface 44'. This would be a wireless type communication interface that would allow the programming to occur away from the engine compartment of the motor vehicle 10. The external programming communication interface 44' would also be able to provide feedback to a remote location by defining the output performance of the motor vehicle during the pre-staged and staged portions of a drag race.

The micro-control unit 36 is designed to identify a starting duty cycle parameter which is used as an initial starting point. The micro-control unit 36 also has a duty cycle sweep rate parameter which is used to allow the duty cycle to decrease allowing a smooth and proportional increase in slippage, resulting in more creep in the motor vehicle 10. An ending duty cycle parameter is used to identify the minimum duty cycle, which correlates into the maximum amount of creep, and an ending point for the sweeping change in the duty cycle to identify the minimum of the range in which the micro-control unit 36 is able to output.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A transmission brake assembly for controlling an output of a transmission of a motor vehicle, said transmission brake assembly comprising:

a solenoid operatively engagable with the transmission to selectively engage and disengage the transmission;

a solenoid driver electrically connected to said solenoid to drive said solenoid into and out of engagement with the transmission; and a controller electrically connected to said solenoid driver, said controller turning said solenoid driver between an on state, an off state and an intermediate state, such that said solenoid partially engages the transmission to allow the motor vehicle to move forward at a minimal speed.

2. A transmission brake assembly as set forth in claim 1 wherein said controller includes a micro-control unit electrically connected to said solenoid driver to produce a pulse-width modulated signal to activate said solenoid driver to the on and intermediate states.

3. A transmission brake assembly as set forth in claim 2 including a switching mechanism electrically connected to said micro-control unit, said switching mechanism providing a switch input to said micro-control unit to set the pulse-width modulated signal produced thereby.

4. A transmission brake assembly as set forth in claim 3 including a programming input device to set and modify operating parameters of said micro-control unit.

5. A transmission brake assembly as set forth in claim 4 wherein said programming input device is hard-wired to said micro-control unit.

6. A transmission brake assembly as set forth in claim 4 wherein said programming input device includes an external communications interface to receive programming signals wirelessly.

7. A transmission brake assembly as set forth in claim 4 wherein said controller further includes a driveshaft sensor electrically connected to said micro-control unit to identify the position of a driveshaft of the motor vehicle.

8. A transmission brake assembly as set forth in claim 7 wherein said controller further includes a manifold absolute pressure sensor electrically connected to said micro-control unit to sense the pressure in a manifold of the motor vehicle.

9. A transmission brake assembly as set forth in claim 8 wherein said controller further includes a throttle position sensor to identify a position of a throttle of the motor vehicle.

10. A transmission brake assembly for controlling an output of a transmission of a motor vehicle, said transmission brake assembly comprising:
    a solenoid operatively engagable with the transmission to selectively engage and disengage the transmission;
    a solenoid driver electrically connected to said solenoid to drive said solenoid into and out of engagement with the transmission; and
    a controller electrically connected to said solenoid driver, said controller turning said solenoid driver between an on state, an off state and an intermediate state, such that said solenoid partially engages the transmission to allow the motor vehicle to move forward at a minimal speed, said controller including a programming input device hard-wired thereto.

11. A transmission brake assembly as set forth in claim 10 wherein said controller includes a micro-control unit electrically connected to said solenoid driver to produce a pulse-width modulated signal to activate said solenoid driver to the on and intermediate states.

12. A transmission brake assembly as set forth in claim 11 including a switching mechanism electrically connected to said micro-control unit, said switching mechanism providing a switch input to said micro-control unit to set the pulse-width modulated signal produced thereby.

13. A transmission brake assembly as set forth in claim 12 wherein said controller further includes a driveshaft sensor electrically connected to said micro-control unit to identify the position of a driveshaft of the motor vehicle.

14. A transmission brake assembly as set forth in claim 13 wherein said controller further includes a manifold absolute pressure sensor electrically connected to said micro-control unit to sense the pressure in a manifold of the motor vehicle.

15. A transmission brake assembly as set forth in claim 14 wherein said controller further includes a throttle position sensor to identify a position of a throttle of the motor vehicle.

16. A transmission brake assembly for controlling an output of a transmission of a motor vehicle, said transmission brake assembly comprising:
    a solenoid operatively engagable with the transmission to selectively engage and disengage the transmission;
    a solenoid driver electrically connected to said solenoid to drive said solenoid into and out of engagement with the transmission; and
    a controller electrically connected to said solenoid driver, said controller turning said solenoid driver between an on state, an off state and an intermediate state, such that said solenoid partially engages the transmission to allow the motor vehicle to move forward at a minimal speed, said controller including an external communications interface to receive programming signals wirelessly.

17. A transmission brake assembly as set forth in claim 16 wherein said controller includes a micro-control unit electrically connected to said solenoid driver to produce a pulse-width modulated signal to activate said solenoid driver to the on and intermediate states.

18. A transmission brake assembly as set forth in claim 17 wherein said controller further includes a driveshaft sensor electrically connected to said micro-control unit to identify the position of a driveshaft of the motor vehicle.

19. A transmission brake assembly as set forth in claim 18 wherein said controller further includes a manifold absolute pressure sensor electrically connected to said micro-control unit to sense the pressure in a manifold of the motor vehicle.

20. A transmission brake assembly as set forth in claim 19 wherein said controller further includes a throttle position sensor to identify a position of a throttle of the motor vehicle.

21. A transmission brake assembly as set forth in claim 20 including a switching mechanism electrically connected to said micro-control unit, said switching mechanism providing a switch input to said micro-control unit to set the pulse-width modulated signal produced thereby.

\* \* \* \* \*